United States Patent [19]

Choi

[11] Patent Number: 5,699,236
[45] Date of Patent: Dec. 16, 1997

[54] HIGH-VOLTAGE STABILIZATION CIRCUIT OF A MONITOR

[75] Inventor: Hyun-Chil Choi, Seoul, Rep. of Korea

[73] Assignee: Daewoo Electronics Co., Ltd., Seoul, Rep. of Korea

[21] Appl. No.: 655,798

[22] Filed: May 30, 1996

[30] Foreign Application Priority Data

May 31, 1995 [KR] Rep. of Korea ............ 95-14138

[51] Int. Cl.⁶ ............................................. H02J 1/00
[52] U.S. Cl. ............................ 363/15; 363/78; 363/95; 315/411
[58] Field of Search ............................. 323/262; 363/15, 363/20, 21, 78, 95, 97, 98, 131; 315/411

[56] References Cited

U.S. PATENT DOCUMENTS

| | | | |
|---|---|---|---|
| 4,677,534 | 6/1987 | Okochi | 363/21 |
| 4,823,248 | 4/1989 | Ikeuchi et al. | 363/20 |
| 5,354,972 | 10/1994 | Han | 363/21 X |
| 5,572,413 | 11/1996 | Hirahara | 363/21 |

Primary Examiner—Peter S. Wong
Assistant Examiner—Y. J. Han
Attorney, Agent, or Firm—Lowe, Price, LeBlanc & Becker

[57] ABSTRACT

A high-voltage stabilization circuit of a monitor can detect accurately a change of a high voltage of a secondary winding of a high-voltage transformer. The high-voltage stabilization circuit of a monitor including a high-voltage transformer for inputting the plurality of signals and outputting the plurality of voltages; a high-voltage signal output circuit for rectifying a first output voltage among the plurality of outputted voltages, and for supplying the first output voltage to a cathode ray tube; a detection circuit for inputting a second output voltage lowest voltage among the plurality of outputted voltages and a third output voltage greater than the second output voltage and lowest among the plurality of outputted voltages, and for outputting an average voltage of the second output voltage and the third output voltage as a detection signal; and a control circuit for inputting a first signal from outside and a detection signal of the detection circuit, and for generating a first input signal among the plurality of input signals by varying a duty ratio of the first signal by controlling the first signal according to the detection signal. The change of a first output voltage of a high-voltage transformer can be detected accurately by a direct sensing from a high-voltage transformer.

12 Claims, 4 Drawing Sheets

HIGH-VOLTAGE STABILIZATION CIRCUIT OF A MONITOR

BACKGROUND OF THE INVENTION

1. Field of the Invention

The present invention relates to a monitor, particularly to a high-voltage stabilization circuit of a monitor.

2. Description of the Prior Art

A general monitor is shown in FIG. 1, where reference numeral 1 is a pulse width modulation section which generates a pulse width modulation signal OUT1 having a constant frequency according to a horizontal synchronization signal Hs supplied from outside, while reference numeral 2 is a horizontal signal output section which generates a pulse-form high-voltage signal OUT2 during a retrace period by a switching operation according to a pulse width modulation signal OUT1.

Reference numeral 3 is a control section which outputs electric power B+ by varying a duty ratio of a voltage $V_{cc}$ supplied from outside according to a detection signal $V_{fb}$ of a detection section 6.

Reference numeral 4 is a high-voltage transformer at which a high voltage is generated by supplying a high-voltage signal OUT2 of a horizontal signal output section 2 and power B+ to a primary coil. The high-voltage transformer 4 is usually comprised of a primary winding 4a and a secondary winding 4b. The secondary winding is comprised of a plurality of winding units 41, 42 and 43 which are wound around a bobbin (not shown) respectively are diodes 44 and 45 connected among the plurality of winding units 41, 42 and 43 so as to cut off currents flowing in a reverse direction. The plurality of winding units 41, 42 and 43 of the secondary winding are wound to output an excitation voltage which includes a voltage caused by a coupling inductance component and a voltage caused by a leakage inductance component.

Reference numeral 5 is a high-voltage output section comprised of a diode 5a and a capacitor 5b. The diode 5a rectifies the excitation voltage of the secondary winding 4b and the capacitor 5b performs smoothing of the rectified voltage to be supplied to a cathode ray tube CRT.

Reference numeral SL is a detection coil which detects the change of the excitation voltage of the secondary winding 4b of the high-voltage transformer 4. Reference numeral 6 is a detection section which generates a detection signal $V_{fb}$ according to a magnitude of the excitation voltage of the secondary detection winding SL, and varies a duty ratio of power B+ in order to stabilize the excitation voltage of the secondary winding 4b of the high-voltage transformer 4 by supplying the detection signal $V_{fb}$ to the control section 3.

The detection section 6 is shown in FIG. 2 and is illustrated in more details below. It is comprised of a diode 61 to rectify an excitation voltage of the secondary detection winding SL, a resistor 62 to bias the rectified voltage of the diode 61, and a capacitor 63 to generate a detection signal $V_{fb}$ by smoothing the output signal of the resistor 62.

In a conventional high-voltage stabilization circuit thus constructed, a horizontal synchronization signal Hs is supplied to a pulse width modulation section 1 which outputs a pulse width modulation signal OUT1 as a frequency of pulse width modulation signal OUT1 is determined according to a frequency of the horizontal synchronization signal Hs.

Under the circumstance, the control section 3 outputs power B+ while varying a duty ratio of the voltage $V_{cc}$ supplied from outside to about 50%. The power B+ is then supplied to another end of the primary winding 4a of the high-voltage transformer 4.

When a horizontal signal output section 2 is switched to a turn-on state by a pulse width modulation section OUT1 during a trace period, power B+ is supplied to a horizontal signal output section 2 through the primary winding 4a of the high-voltage transformer, and the horizontal signal output section 2 outputs a triangular-waveform horizontal signal OUT2. However, when a horizontal signal output section 2 is switched to a turn-off state according to a pulse width modulation signal OUT1 during a retrace period, a pulse-type high-voltage signal OUT2 is outputted from the horizontal signal output section 2.

The pulse-type high-voltage signal OUT2 is supplied to a plurality of winding units 41, 42 and 43 of the secondary winding 4b of the high-voltage transformer 4 and is then excited, of which excitation voltage is determined by a winding ratio of the primary winding 4a and the secondary winding 4b. At this time, a reverse current flowing through the plurality of winding units 41, 42 and 43 of the secondary winding 4b is prevented by diodes 44 and 45.

The excitation voltage of the plurality of winding units 41, 42 and 43 includes a voltage caused by a coupling inductance component and a voltage caused by a leakage inductance component. The voltage caused by a leakage inductance component is lost by leakage inductance 46, 47 and 48 indicated by dotted line in FIG. 1.

For example, assuming that a voltage necessary for cathode ray tube CRT is about 25 KV, an excitation voltage generated from the plurality of winding units 41, 42 and 43 is about 27 KV including a voltage caused by a coupling inductance component and a voltage caused by a leakage inductance component. Among the excitation voltage of the plurality of winding units 41, 42 and 43, 2 KV, which is the voltage caused by the leakage inductance component, is lost as a leakage inductance 46, 47 and 48. This makes the excitation voltage of the secondary winding 4b be about 25 KV.

The excitation voltage of the secondary winding 4b is supplied to a diode 5a of the high-voltage output section 5, and the diode 5a rectifies the excitation voltage and outputs a rectified voltage. The rectified voltage is supplied to a capacitor 5b, which performs smoothing of the rectified voltage and outputs a high voltage which is then supplied to the cathode ray tube CRT.

In the meantime, the excitation voltage of the secondary detection winding SL of the high-voltage transformer 4 is supplied to a diode 61 of the detection section 6, and the excitation voltage of the secondary detection winding SL of the high-voltage transformer 4 is rectified through the diode 61.

Further, an output signal of the diode 61 is supplied to a capacitor 63 through a resistor 62, and the capacitor 63 outputs a detection signal $V_{fb}$ by smoothing the output signal of the resistor 62. The detection signal $V_{fb}$ is supplied to the control section 3, at which the excitation voltage of the secondary winding 4b of the high-voltage transformer 4 is maintained at a high voltage by reducing the duty ratio of power B+ at the detection signal $V_{fb}$. In other words, the high voltage is increased according to power B+ having the duty ratio of 50%; a voltage increased more than a predetermined voltage leads to an increased detection signal $V_{fb}$; and the duty ratio of power B+ is decreased according to a detection signal $V_{fb}$. A high voltage is maintained through these processes.

In the meantime, when an excitation voltage of the secondary winding 4b of the high-voltage transformer 4 varies minutely, the excitation voltage of the secondary detection winding SL of the high-voltage transformer 4 is varied minutely, as well as the detection signal $V_{fb}$. Therefore, the control section 3 stabilizes the high excitation voltage of the secondary winding 4b of the high-voltage transformer 4 by varying the duty ratio of power B+ according to the detection signal $V_{fb}$.

However, for a transient time period after the frequency of the horizontal synchronization signal Hs is varied, the magnitude of the lost voltage of the leakage inductance 46, 47 and 48 is not detected accurately by a detection section 6, and therefore, variation of the high voltage supplied to the cathode ray tube CRT can not be accurately measured. Therefore, a long time is required for maintaining the constant excitation voltage of the secondary winding 4b of the high-voltage transformer 4, and there occurs a problem of fluctuation of a screen due to unstable operation of the cathode ray tube CRT until the excitation voltage is stabilized constantly.

SUMMARY OF THE INVENTION

Therefore, it is an object of the present invention to provide a high-voltage stabilization circuit of a monitor which can detect the change of the excitation voltage of the secondary winding of a high-voltage transformer to thereby maintain a high voltage constantly.

In order to achieve the above object, the high-voltage stabilization circuit of a monitor according to an embodiment of the present invention is comprised of a high-voltage transformer which inputs a plurality of signals and output a plurality of voltages; a high-voltage output section which rectifies a first output voltage among the plurality of output voltages of a high-voltage transformer, and supplies the rectified first output voltage to the cathode ray tube CRT; a detection section which inputs the lowest second output voltage among the plurality of output voltages of the high-voltage transformer as well as the third output voltage which is larger than the second output voltage and smallest among the remaining output voltages, and which outputs an average voltage of the second output voltage and the third output voltage as a detection signal; and a control section which inputs the first signal from outside and a detection signal of the detection section, add which generates a first input signal among the plurality of input signals by varying a duty ratio of the first signal by controlling the above first signal according to the detection signal.

According to a preferred embodiment of the present invention, a plurality of voltages are outputted at a high-voltage transformer when a plurality of signals are supplied to a high-voltage transformer, a first output voltage among the plurality of output voltages is supplied to a high-voltage output section, at which a first output voltage is rectified and supplied to the cathode ray tube CRT. Among the plurality of output voltages of the high-voltage transformer, a second and a third output voltages are supplied to the detection section, at which an average of the second and the third output voltages is outputted as a detection signal. The detection signal and a first signal supplied from outside is supplied to the control section, at which a first input signal is supplied to a high-voltage transformer by varying a duty ratio of the first input signal among the plurality of input signals of the high-voltage transformer according to the magnitude of the detection signal. That is, if a first output voltage of a high-voltage transformer is increased more than a predetermined voltage, a detection signal is increased, and the duty ratio of a first input signal is reduced. Through these processes, the first output voltage of the high-voltage transformer is maintained constantly. Accordingly, the change of the first output voltage of the high-voltage transformer is directly and accurately detected from the high-voltage transformer.

BRIEF DESCRIPTION OF THE DRAWINGS

The accompanying drawings, which are incorporated in and constitute a part of this specification, illustrate an embodiment of the invention and, together with the description, serve to explain the objects, advantages, and principles of the invention.

In the drawings.

DESCRIPTION OF THE PREFERRED EMBODIMENT

A preferred embodiment of the present invention is illustrated in more detail with reference to the accompanying drawings.

Figure 1:
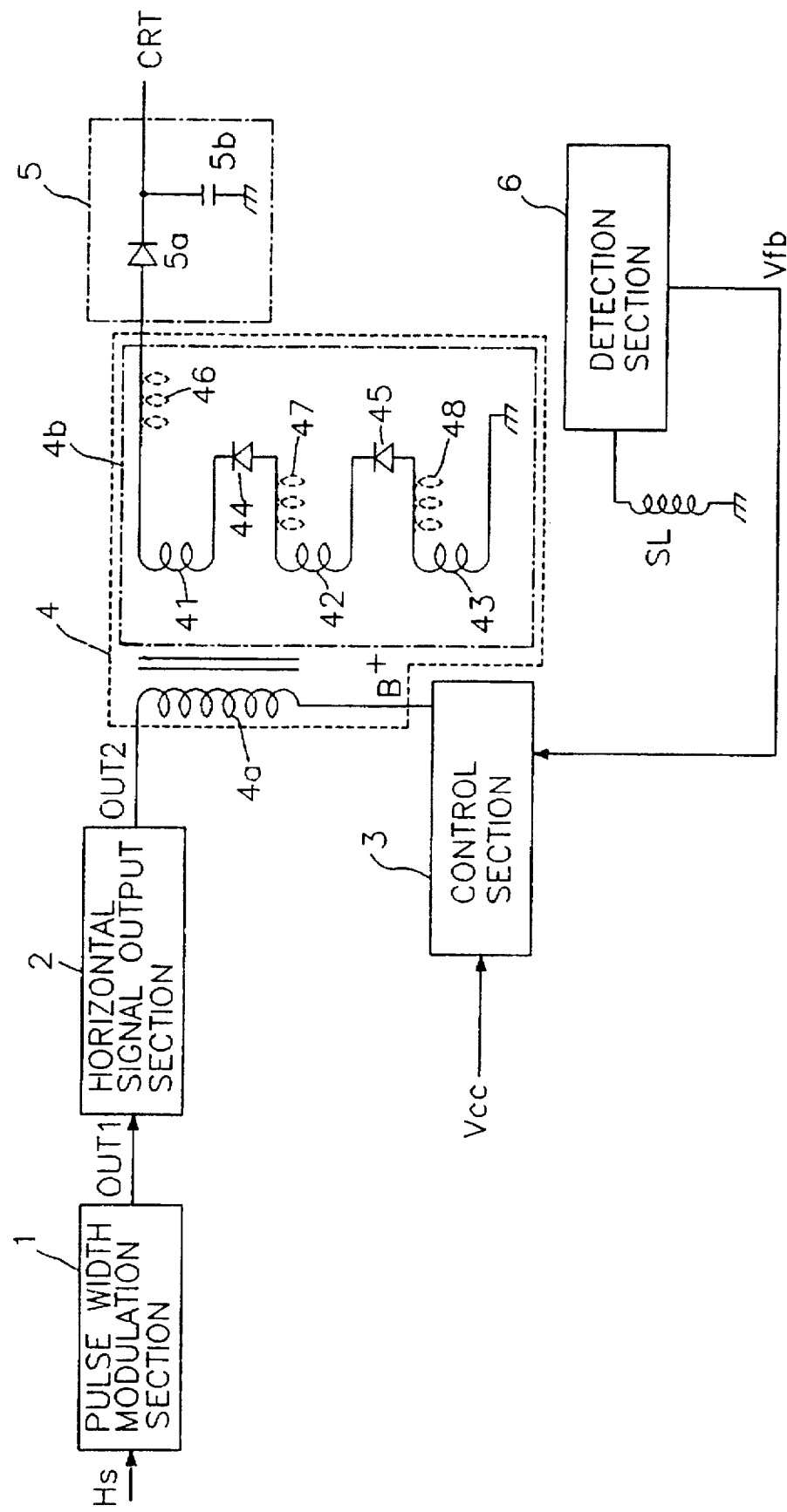
FIG. 1 is a conventional high-voltage stabilization circuit of a monitor.
Figure 2:
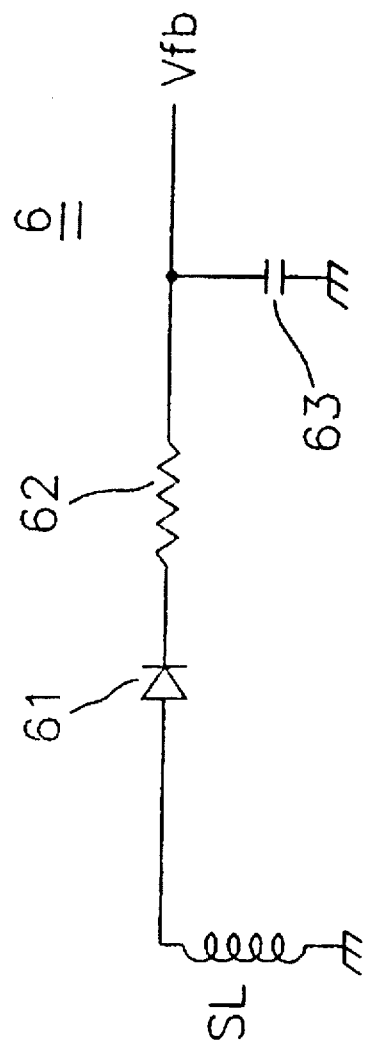
FIG. 2 is a detailed circuit of a detection section of FIG. 1.
Figure 3:
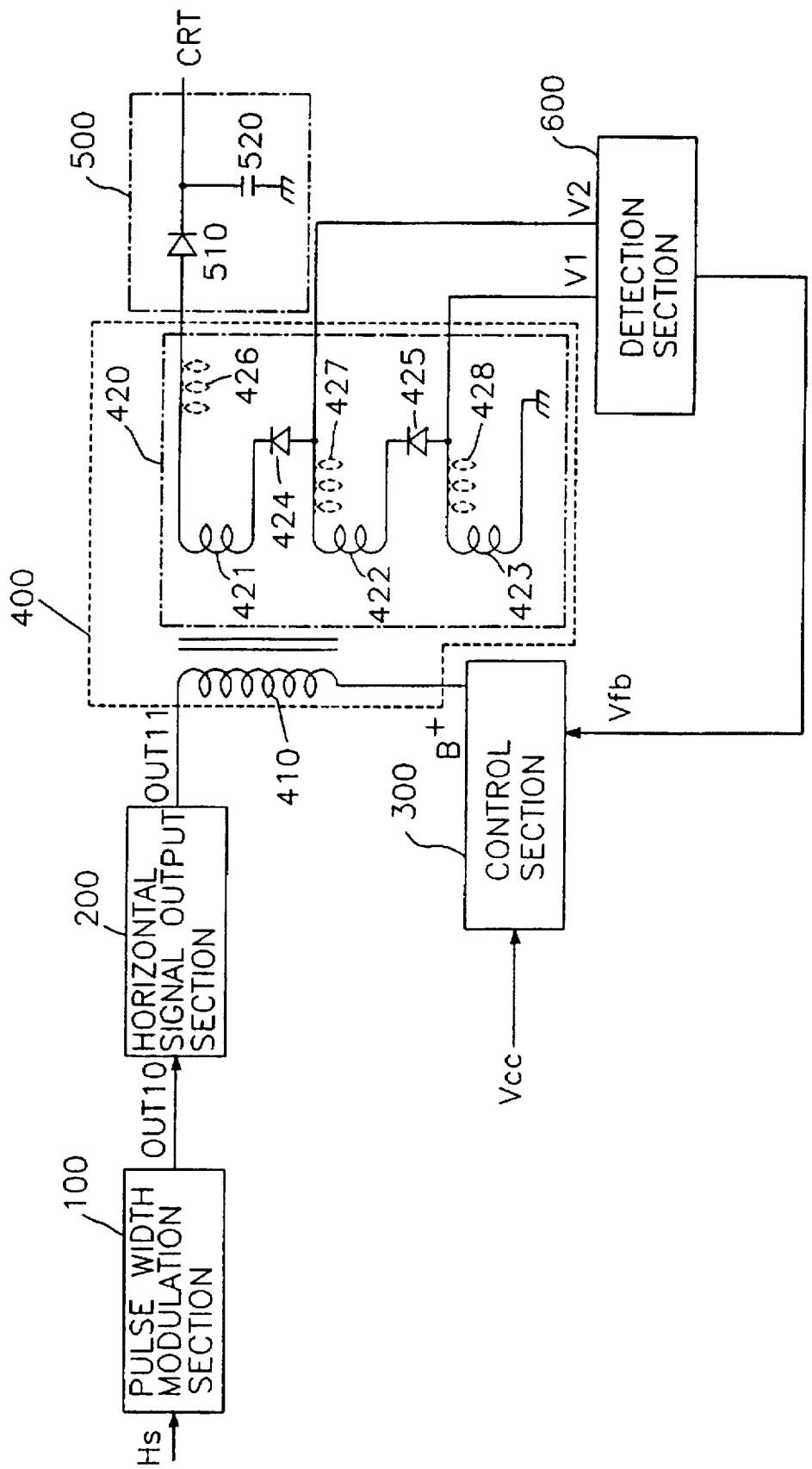
FIG. 3 is a high-voltage stabilization circuit of a monitor constructed according to an embodiment of the present invention.

FIG. 3 is a high-voltage stabilization circuit of a monitor constructed according to an embodiment of the present invention. Reference numeral 100 is a pulse width modulation section which generates a pulse width modulation signal OUT10 according to a frequency of a horizontal synchronization signal Hs supplied from outside, and reference numeral 200 is a horizontal signal output section which generates a horizontal signal and a high-voltage signal OUT11 by a switching operation according to a pulse width modulation signal OUT10. Reference numeral 300 is a control section which outputs electric power B+ by varying a duty ratio of a voltage $V_{cc}$ supplied from outside according to the magnitude of a detection signal $V_{fb}$.

Reference numeral 400 is a high-voltage transformer at which power B+ is supplied to a primary winding when a horizontal signal output section 200 is switched to a turn-off state according to a pulse width modulation signal OUT10, and a high voltage is generated at a secondary winding. As in a conventional high-voltage transformer, a high-voltage transformer 400 in the present invention is comprised of a primary winding 410 and a secondary winding 420. The secondary winding 420 is comprised of a plurality of winding units 421, 422 and 423 for outputting excitation voltage including a voltage caused by a coupling inductance component and a voltage caused by a leakage inductance component, and diodes 424 and 425 for preventing a reverse flow of current among the plurality of winding units 421, 422 and 423.

Reference numeral 500 is a high-voltage output section comprised of a diode 510 and a capacitor 520. the diode 510 rectifies an excitation voltage of a secondary winding 420 of a high-voltage transformer 400, and the capacitor 520 performs smoothing of the rectified voltage to supply smoothed rectified voltage of the secondary winding 420 to a cathode ray tube CRT.

Reference numeral 600 is a detection section for outputting as a detection signal $V_{fb}$ an average value of an excitation voltage of the winding unit 423 which outputs the lowest voltage V1 (about several hundreds volts) among the secondary winding 420 of the high-voltage transformer 400, and an excitation voltage of the winding unit 422 which outputs the lowest voltage V2 among the remaining winding units 421 and 422, that is, the lowest voltage V2 is larger than the lowest voltage V1, and for supplying the detection signal $V_{fb}$ to the control section 300.

Figure 4:
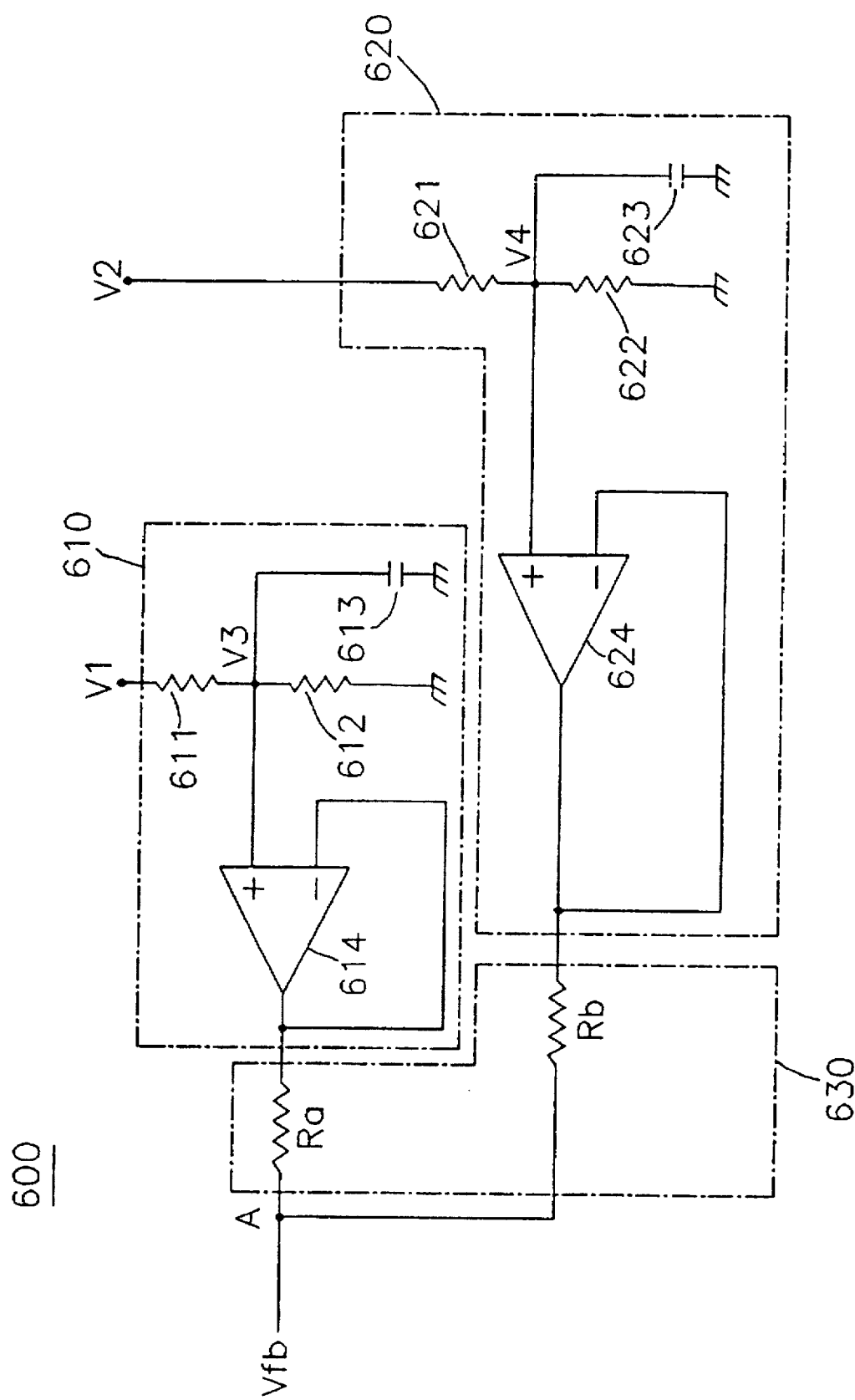
FIG. 4 is a detailed circuit of a detection section of FIG. 3.

The detection section 600 is shown in FIG. 4. Reference numeral 610 is a first detection section which detects the excitation voltage V1 of the winding unit 423 having the lowest voltage among the secondary windings 420 of the high-voltage transformer 400, and reference numeral 620 is a secondary detection section which detects an excitation voltage V2 of the winding unit 422 having the lowest voltage among the remaining windings 421 and 422 except for the winding 423 of the secondary winding 420.

Reference numeral 630 is an averaging section at which an average value of the output signals is obtained from the first detection section 610 and the second detection section 620.

In other words, a connecting point of resistors 611 and 612 of the primary detection section 610 which divides the excitation voltage V1 of the winding 423 is connected to one end of a capacitor 613 for stabilizing the division voltage V3 of the connecting point, while the other end of the capacitor 613 is connected to earth. The connecting point is again connected to a positive terminal of a buffer 614 for protecting the division voltage V3 by removing loading effect of the division voltage V3, and the negative terminal of the buffer 614 is connected to the output terminal of the buffer 614.

As in the primary detection section 610, the secondary detection section 620 is comprised of resistors 621 and 622, a capacitor 623, and a buffer 624. Each of the output terminals of the buffers 614 and 624 is connected to each of resistors Ra and Rb of the averaging section 630 for obtaining an average value of the output signals of the buffers 614 and 624, while each of the resistors Ra and Rb is also connected to a node A which inputs the detection signal $V_{fb}$.

The operation and effect of the high-voltage stabilization circuit of a monitor according to an embodiment of the present invention thus constructed are depicted below:

A horizontal synchronization signal Hs from outside is supplied to a pulse width modulation section 100. The pulse width modulation section 100 determines a frequency of a pulse width modulation signal OUT10 according to a frequency of the horizontal synchronization signal Hs, and outputs a pulse width modulation signal OUT10.

Under the circumstance, the control section 300 outputs power B+ by varying a duty ratio of a voltage $V_{cc}$ supplied from outside to a maximum (to about 50%) since a detection signal $V_{fb}$ which is nearly a 0V, of the detection section 600 is inputted. The power B+ of the control section 300 is supplied to the primary winding 410 of a high-voltage transformer 400.

If a horizontal signal output section 200 is switched to a turn-on state according to a pulse width modulation signal OUT10 during a trace period, power B+ is supplied to a horizontal signal output section 200 through the primary winding 410 of the high-voltage transformer 400, and the horizontal signal output section 200 outputs a triangular-waveform horizontal signal OUT11. However, when a horizontal signal output section 200 switched to a turn-off state according to a pulse width modulation signal OUT10 during a retrace period, a pulse-type high-voltage signal OUT11 is outputted from the horizontal signal output section 200.

the pulse-type high-voltage signal OUT11 is supplied to a plurality of winding units 421, 422 and 423 of the secondary winding 420 of the high-voltage transformer 400 to be excited, of which excitation voltage is determined by a winding ratio of the primary winding 410 and the secondary winding 420. At this time, a reverse current flowing through a plurality of winding units 421, 422 and 423 is prevented by diodes 424 and 425. Among the excitation voltages of the plurality of winding units 421, 422 and 423, a voltage caused by a leakage inductance component is lost as a leakage inductance 426, 427 and 428.

The excitation voltage of the secondary winding 420 is supplied to a diode 510 of the high-voltage output section 500, and the diode 510 rectifies the excitation voltage and outputs the rectified voltage. The rectified voltage is supplied to a capacitor 520, which performs smoothing of the rectified voltage and outputs the high voltage to be supplied to the cathode ray tube CRT.

In the meantime, an excitation voltage V1 of the winding 423 which outputs the lowest volt (about several hundreds of volts) among the plurality of winding units 421,422 and 423 is supplied to a primary detection section 610 of a detection section 600, and the primary detection section 610 divides the excitation voltage V1 of the winding unit 423 and outputs a division voltage V3. That is, the excitation voltage V1 of the winding unit 423 is supplied to resistors 611 and 612 of the primary detection section 610, and is divided by resistors 611 and 612. The voltage V3 divided by resistors 611 and 612 is then stabilized by a capacitor 613. The voltage V3 is supplied to a buffer 614 which protects the voltage V3 by removing loading effect across the buffer 614. That is, any electric current does not flow into the buffer 614 to thereby prevent the voltage V3 from being divided by resistor 612 and resistor Ra.

Under the circumstance, an excitation voltage V2 of the winding unit 422 which outputs the lowest voltage among the winding units 421 and 422 except for the winding unit 423 is supplied to, and divided by, a secondary detection section 620 of a detection section 600.

In other words, the excitation voltage V2 of the winding unit 422 is supplied to, and divided by, resistors 621 and 622 of the secondary detection section 620. A division voltage V4 of the resistors 621 and 622 is smoothed by a capacitor 623 to be stabilized. The division voltage V4 is supplied to a buffer 624 which protects the division voltage V4 of the resistor Rb and 622 by removing loading effect. That is, any electric current does not flow into the buffer 624 to thereby prevent the voltage V4 from being divided by resistor 622 and resistor Rb.

The division voltage V3 of the primary detection section 610 and the division voltage V4 of the secondary detection section 620 is supplied to resistors Ra, Rb, respectively, of an averaging section 630 which outputs a detection signal $V_{fb}$ by averaging the division voltages V3 and V4.

The detection signal $V_{fb}$ can be computed from the following equation:

$$V_{fb}=[(Ra \times V3)/(Ra+Rb)]+[(Rb \times V4)/(Ra+Rb)]$$

where $V_{fb}=V3=V4$ if $V3=V4$. The detection signal $V_{fb}$ is supplied to a control section 300, at which a duty ratio of power B+ outputted from the control section 300 is varied according a detection signal $V_{fb}$.

In other words, the control section 300 outputs the power B+having the highest duty ratio in order to increase a voltage of the excitation voltage of the high-voltage transformer 400 since a detection signal $V_{ft}$ of a detection section 600 is inputted into a control section 400 as almost 0 V. Once a detection signal $V_{ft}$ is increased according to an increase of an excitation voltage of the high-voltage transformer 400, the control section 300 reduces gradually the duty ratio of the power B+, and maintains a high voltage by repeating the above process.

By using a high-voltage stabilization circuit of a monitor, the change of an excitation voltage of a secondary winding of a high-voltage transformer can be detected from an average value of an excitation voltage of a winding unit generating the first lowest voltage among the secondary windings of a high-voltage transformer and that of another winding unit generating the second lowest voltage among the remaining winding units except for that generating the first lowest voltage. Therefore, an error in a detection signal due to an inaccurate detection of a leakage inductance component while a frequency of a horizontal sychronization signal is varied can be minimized, and further, stabilization of a high voltage can be achieved.

It will be apparent to those skilled in the art that various modifications and variations can be made in the disclosed invention without departing from the scope or spirit of the invention. Other embodiments of the invention will be apparent to those skilled in the art from consideration of the specification and practice of the invention disclosed herein. That is, a high-voltage stabilization circuit of the present invention can be used for other general image treatment systems in addition to a monitor.

What is claimed is:

1. A high-voltage stabilization circuit of a monitor, comprising:
    a high-voltage transformer for inputting a plurality of signals and outputs a plurality of voltages;
    a high-voltage signal output means for rectifying a first output voltage among said plurality of output voltages of said high-voltage transformer, and for supplying said first output voltage to a cathode ray tube;
    a detection means for outputting a detection signal by sensing a smallest output voltage among said plurality of output voltages of said high-voltage transformer; and
    a control means for generating a first input signal having a varied duty ratio of a voltage supplied from outside among said plurality of input signals according to said detection signal.

2. The high-voltage stabilization circuit of a monitor as claimed in claim 1, wherein said plurality of input signals are high-voltage signals outputted from a horizontal output section and a first input signal from said control means.

3. The high-voltage stabilization circuit of a monitor as claimed in claim 1, wherein said high-voltage transformer is comprised of a primary winding and a secondary winding, said secondary winding being comprised of a plurality of winding units wound around a bobbin and a diode connected between said plurality of winding units for cutting off a reverse-flowing current.

4. The high-voltage stabilization circuit of a monitor as claimed in claim 3, wherein said plurality of winding units are three winding units.

5. The high-voltage stabilization circuit of a monitor as claimed in claim 3, wherein said detection means is comprised of:
    a first and a second resistor for dividing an lowest excitation voltage among said plurality of winding units, and for outputting the divided excitation voltage as a detection signal; and
    a buffer connected to an input terminal of said second resistor for protecting said divided excitation voltage.

6. The high-voltage stabilization circuit of a monitor as claimed in claim 5, further comprised of a first capacitor connected in parallel with said second resistor for stabilizing said divided excitation voltage.

7. A high-voltage stabilization circuit of a monitor, comprising:
    a high-voltage transformer for inputting a plurality of signals and outputs a plurality of voltages;
    a high-voltage signal output means for rectifying a first output voltage among the plurality of outputted voltages, and for supplying said rectified first output voltage to a cathode ray tube;
    a detection means for inputting a second output voltage lowest among the plurality of outputted voltages, and a third output voltage greater than the second output voltage and lowest among the plurality of outputted voltages, and for outputting an average voltage of said second output voltage and said third output voltage as a detection signal; and
    a control means for inputting a first signal from outside and a detection signal of said detection means, and for generating a first input signal among the plurality of input signals by varying a duty ratio of said first signal by controlling said first signal according to said detection signal.

8. The high-voltage stabilization circuit of a monitor as claimed in claim 7, wherein said detection means is comprised of:
    a voltage detection means for outputting a first and a second divided voltages by dividing a second output voltage lowest among the plurality of outputted voltages and a third output voltage greater than a second output voltage and lowest among the plurality of outputted voltages; and
    an averaging means for outputting as a detection signal an average voltage of a first and a second divided voltages of said voltage detection means.

9. The high-voltage stabilization circuit of a monitor as claimed in claim 8, wherein said averaging means is comprised of a seventh and an eighth resistors for inputting said first and said second divided voltages, and for outputting as said detection signal an average voltage of said first and said second divided voltages.

10. The high-voltage stabilization circuit of a monitor as claimed in claim 8, wherein said voltage detection means is comprised of:
    a third and a fourth resistors for inputting said second output voltage and for outputting said first divided voltage by dividing said second output voltage;
    a buffer connected to an input terminal of said fourth resistor for protecting said first divided voltage;
    a fifth and a sixth resistors for inputting said third output voltage and for outputting said second divided voltage by dividing said third output voltage; and
    a buffer connected to an input terminal of said sixth resistor for protecting said second divided voltage.

11. The high-voltage stabilization circuit of a monitor as claimed in claim 10, further comprised of a second capacitor connected in parallel with an input terminal of said fourth resistor for stabilizing said first divided voltage.

12. The high-voltage stabilization circuit of a monitor as claimed in claim 10, further comprised of a third capacitor connected in parallel with an input terminal of said sixth resistor for stabilizing said second divided voltage.

* * * * *